United States Patent [19]

Ochiai et al.

[11] Patent Number: 4,622,098
[45] Date of Patent: Nov. 11, 1986

[54] METHOD FOR MANUFACTURING SEMICONDUCTOR STRAIN SENSOR

[75] Inventors: Nobuo Ochiai, Kawasaki; Takashi Tsumagari, Zama, both of Japan

[73] Assignee: Tokyo Shibaura Denki Kabushiki Kaisha, Kawasaki, Japan

[21] Appl. No.: 820,598

[22] Filed: Jan. 21, 1986

Related U.S. Application Data

[62] Division of Ser. No. 545,264, Oct. 25, 1983, abandoned.

[30] Foreign Application Priority Data

Oct. 27, 1982 [JP] Japan .................................. 57-187471
May 16, 1983 [JP] Japan .................................. 58-84171

[51] Int. Cl.$^4$ ...................... H01L 21/306; B44C 1/22; C03C 15/00; C03C 25/06
[52] U.S. Cl. ................................ 156/645; 79/610 SG; 51/281 R; 156/657; 156/662
[58] Field of Search ............... 156/639, 645, 643, 646, 156/657, 662, 345; 29/610 SG; 51/281 R, 281 P; 338/2-5, 36; 357/26, 55; 73/720-721, 726-727

[56] References Cited

U.S. PATENT DOCUMENTS

| | | | |
|---|---|---|---|
| 2,992,556 | 7/1961 | Webster | 73/141 |
| 3,455,165 | 7/1969 | Huet | 338/4 |
| 3,819,431 | 6/1974 | Kurtz et al. | 156/645 |
| 4,236,137 | 11/1980 | Kurtz et al. | 357/26 |
| 4,443,293 | 4/1984 | Mallon et al. | 156/662 X |
| 4,507,170 | 3/1985 | Myhre | 156/633 |

FOREIGN PATENT DOCUMENTS

| | | |
|---|---|---|
| 1226806 | 11/1960 | Fed. Rep. of Germany . |
| 1648725 | 7/1971 | Fed. Rep. of Germany . |
| 2618399 | 11/1976 | Fed. Rep. of Germany . |
| 2711749 | 10/1977 | Fed. Rep. of Germany . |
| 52-67584 | 6/1977 | Japan ................................. 357/26 |
| 54-162985 | 12/1979 | Japan ................................. 357/26 |
| 54-162492 | 12/1979 | Japan ................................. 357/26 |
| 55-77178 | 6/1980 | Japan ................................. 357/26 |
| 1581215 | 12/1980 | United Kingdom . |

Primary Examiner—William A. Powell
Attorney, Agent, or Firm—Cushman, Darby & Cushman

[57] ABSTRACT

A semiconductor strain sensor has a semiconductor substrate having a pair of major surfaces parallel to each other. The substrate is worked to constitute a frame and a thin diaphragm by forming a circular blind hole from one major surface. The bottom surface of the blind hole is formed in a conical shape projecting upward from the edge portion to a central portion thereof. The substrate has a thickness of not less than 0.5 mm and not less than about five times that of the diaphragm. The blind hole is formed by grinding and the inner surface of the blind hole is then etched to eliminate a scratch formed in the inner surface by grinding. Resistance layers are formed on the other major surface of the substrate. Each layer has a piezoresistance which varies in accordance with the pressure applied to the diaphragm.

5 Claims, 11 Drawing Figures

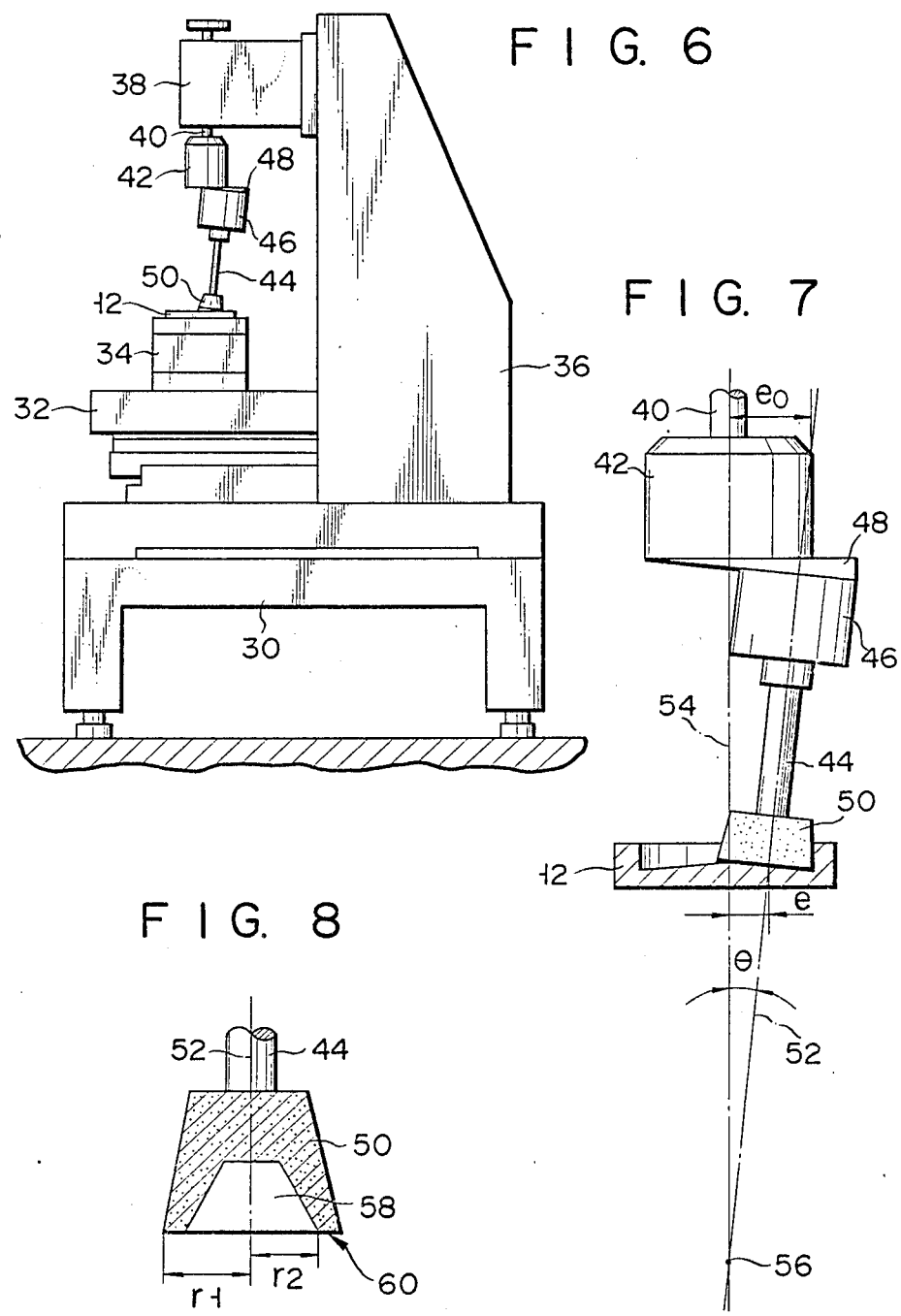

METHOD FOR MANUFACTURING SEMICONDUCTOR STRAIN SENSOR

This is a division of application Ser. No. 545,264, filed Oct. 25, 1983, which was abandoned upon the filing hereof.

BACKGROUND OF THE INVENTION

The present invention relates to a semiconductor strain sensor for a pressure-detecting apparatus or the like and a method for manufacturing the same.

In a pressure-measuring sensor of the type which is frequently used, a thin diaphragm is formed in a semiconductor substrate, such as silicon (Si), by forming a blind hole in a major surface of the semiconductor substrate and resistance layers made by diffusing an impurity of a conductivity type opposite that of the diaphragm. In the strain sensor of this type, pressure measurement is performed by transducing to an electrical signal the pressure difference between pressures applied to two sides of the diaphragm by way of piezoresistive changes. The semiconductor strain sensor must ideally generate a linear output voltage in proportion to the pressure difference. However, in practice, the relationship between the pressure difference and the output voltage is not completely linear but nonlinear. Further, a change in output voltage for a positive pressure difference must ideally be symmetrical with that for a negative pressure difference. However, when a diaphragm is flat, changes in output voltages for positive and negative pressure differences become asymmetrical. This is because distortions in the diaphragm for the positive and negative pressure differences differ slightly from each other. The asymmetrical characteristic of the output voltages is a cause of degradation in measuring precision. In order to perform a highly precise pressure measurement, the asymmetrical characteristic described above must be compensated. For this purpose, a special correction circuit must be used, and adjusting operations must be performed to compensate for the asymmetry. Furthermore, the asymmetrical characteristic must be compensated for the expense of sensitivity, and the gain of an amplifier circuit system must be increased, resulting in unstable circuit operation.

A semiconductor strain sensor has been proposed wherein a projection is formed on a bottom surface of the blind hole (upper surface of the diaphragm) of the semiconductor strain sensor, with the thickness of the central portion of the diaphragm greater than that of the edge portion in order to improve the asymmetrical characteristic described above. This semiconductor strain sensor is manufactured in the following manner.

As shown in FIG. 1, an annular $Si_3N_4$ resist film 102 is deposited on one major surface of a disc-shaped monocrystalline silicon substrate 100. Diffusion resistance layers 104 are formed on the other major surface of the monocrystalline silicon substrate 100. This silicon substrate 100 is fixed by wax 108 on a crystal base 106 such that the other major surface of the monocrystalline silicon substrate contacts the surface of the crystal base. The monocrystalline silicon substrate 100 is dipped together with the crystal base 106 in an etching solution 112 contained in an etching tank 110. The etching tank 110 is supported by a support 114 which is inclined by a predetermined angle with respect to the horizontal direction. The etching tank 110 is coupled through a shaft 116 to a motor disposed in the support 114. The etching tank 110 rotates at a predetermined speed to etch only the central portion of the monocrystalline silicon substrate 100 which is exposed from the resist film 102, thereby forming a blind hole. Since the etching tank 110 is inclined in a horizontal direction, the etching rate at the edge portion of the blind hole is higher than that at the central portion of the bottom surface thereof. As a result, a diaphragm with a concentrically mound central portion is formed.

The semiconductor strain sensor manufactured by the above method has the following drawbacks. The etching rate is very low, degrading working efficiency. In addition to this drawback, since the blind hole is formed by utilizing a difference between the etching rates of the resist film and the monocrystalline silicon substrate, the depth to which the blind hole can be formed is limited to about 300 $\mu$m. Therefore, a thick monocrystalline silicon substrate cannot be used, and the ratio of the diaphragm thickness to the monocrystalline silicon substrate thickness is about 1:2 to 1:4. As a result, when the semiconductor strain sensor is adhered to a base through glass, the diaphragm and the diffusion resistance layers are subjected to thermal strain, thereby degrading sensitivity of the strain sensor and decreasing the yield. Furthermore, since wet etching is dependent upon the concentration, temperature and convection state of the etching solution, working precision and reproducibility are poor. In addition to these disadvantages, the corner between the inner surface and the bottom surface of the blind hole becomes rounded, thus further degrading sensitivity of the strain sensor.

SUMMARY OF THE INVENTION

The present invention has been made to eliminate the drawbacks described above and has for its object to provide a high-sensitivity semiconductor strain sensor which is substantially free from thermal strain during a process for adhering the semiconductor strain sensor to a base, and a method for manufacturing the same.

According to an aspect of the present invention, there is provided a semiconductor strain sensor comprising: a semiconductor substrate having a pair of major surfaces parallel to each other, the semiconductor substrate being worked to constitute a frame and a thin diaphragm by forming a circular blind hole from one major surface of the semiconductor substrate, the semiconductor substrate having a thickness of not less than about 0.5 mm and about five times that of the diaphragm, and the blind hole having a bottom surface which has a conical shape projecting upward from an edge portion of the bottom surface to a center thereof; and resistance layers formed on the other major surface of the semiconductor substrate and having a piezoresistance which varies in accordance with the pressure applied to the diaphragm. According to the semiconductor strain sensor of the present invention, the thickness of the semiconductor substrate is not less than about 0.5 mm and about five times that of the diaphragm. The thickness of the semiconductor substrate of the present invention is significantly greater than that of the conventional semiconductor substrate. Therefore, the diaphragm and the resistance layers are substantially free from thermal strain when the semiconductor strain sensor is adhered to the base through glass. As a result, the sensor sensitivity to pressure change is greatly improved, and the yield of the sensors is increased. Furthermore, since the bottom surface of the blind hole (i.e., the upper surface of the diaphragm) has a conical shape, changes in output voltages for the negative and positive pressure differences are set to be symmetrical. As a result, highly precise pressure measurement can be performed.

According to another aspect of the present invention, there is provided a method for manufacturing a semiconductor strain sensor, comprising the steps of: forming resistance layers on one major surface of a semiconductor substrate having a pair of major surfaces parallel to each other; forming a circular blind hole from the other major surface of the semiconductor substrate by grinding, such that a bottom surface of the blind hole has a conical shape projecting upward from an edge portion of the bottom surface to a center thereof; and etching an inner surface of the blind hole. According to the method for manufacturing the semiconductor strain sensor of the present invention, the blind hole is formed by grinding. For this reason, the working efficiency and precision can be greatly improved, as compared with the conventional method using the etching technique. Furthermore, a deep blind hole can be formed, and a thick semiconductor substrate can be used. As a result, substantially no thermal strain will be applied to the diaphragm and the resistance layers at the time of glass adhesion. Therefore, the method of the present invention allows the manufacture of a high-performance semiconductor strain sensor of improved sensitivity at a high yield. In addition to these advantages, the corner between the inner surface and the bottom surface of the blind hole can be properly shaped, so that the sensitivity of the semiconductor strain sensor is further improved.

BRIEF DESCRIPTION OF THE DRAWINGS

FIGS. 3 and 4 show a semiconductor strain sensor according to an embodiment of the present invention, in which FIG. 3 is a plan view thereof and FIG. 4 is a sectional view thereof when taken along the line IV—IV of FIG. 3;

FIGS. 6 to 8 show a grinding apparatus used to manufacture the semiconductor strain sensor shown in FIGS. 3 and 4, in which FIG. 6 is a schematic side view showing the overall construction of the grinding apparatus, FIG. 7 is a side view showing the main part of the apparatus shown in FIG. 6, and FIG. 8 is a sectional view of a grinding wheel used in the apparatus shown in FIG. 6;

DETAILED DESCRIPTION OF THE PREFERRED EMBODIMENT

A preferred embodiment of the present invention will be described with reference to the accompanying drawings.

Figure 1:
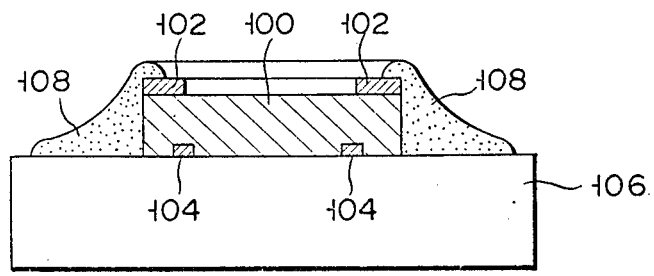
FIG. 1 is a sectional view showing a manufacturing step of a conventional manufacturing method for manufacturing a semiconductor strain sensor.
Figure 2:
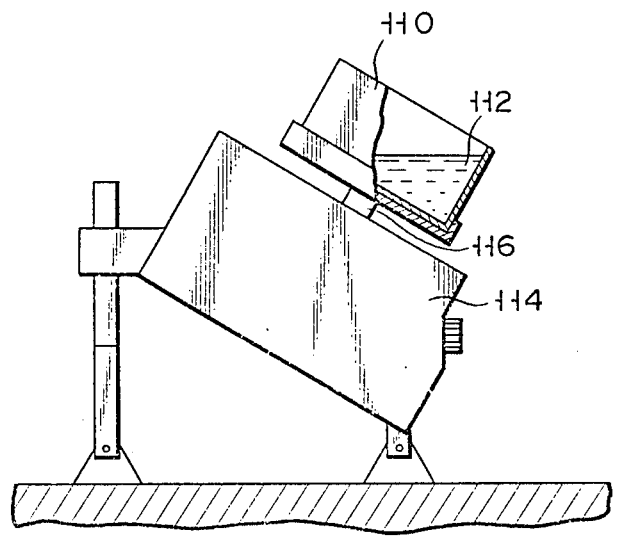
FIG. 2 is a etching apparatus used in the manufacturing method.
Figure 3:
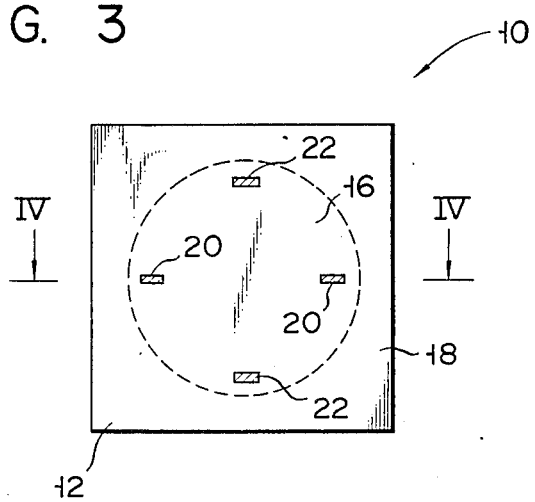
Figure 4:
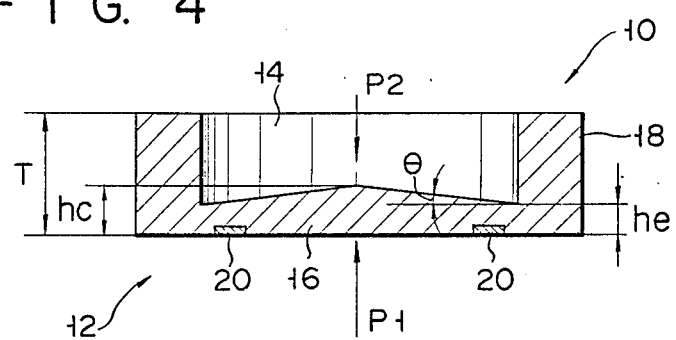
Figure 5:
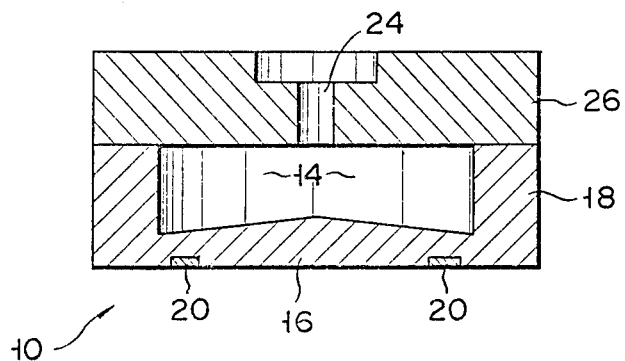
FIG. 5 is a sectional view showing the state wherein the semiconductor strain sensor is fixed on a base.

As shown in FIGS. 3 and 4, a semiconductor strain sensor 10 has a square-shaped semiconductor substrate (e.g., monocrystalline silicon substrate) 12 having a pair of major surfaces which are parallel to each other. A thickness T of the silicon substrate 12 is about 2 mm, and each side of the silicon substrate is about 10 mm.

A circular blind hole 14 is formed in the upper major surface of the substrate 12. The central axis of the blind hole 14 is aligned with that of the substrate 12. The blind hole 14 has a diameter of about 7 mm and a depth of about 1937 $\mu$m. After the blind hole is formed, the substrate 12 constitutes a diaphragm 16 and a frame 18 for supporting the diaphragm 16. The bottom surface of the blind hole 14 (i.e., the upper surface of the diaphragm 16) concentrically and continuously projects upward from its edge portion to its central portion (i.e., in a conical shape). A thickness $h_c$ of the central portion of the diaphragm 16 is about 75 $\mu$m, and a thickness $h_e$ of the edge portion is about 63 $\mu$m. A tilt angle $\theta$ of the bottom surface from the edge portion to the central portion on the upper surface of the diaphragm 16 falls in the range between about 0.05° and 0.3°. Furthermore, as is apparent from FIG. 4, a stepped portion between the wall surface and the bottom surface of the blind hole 14 has an acute angle.

The semiconductor strain sensor 10 further has a pair of rectangular resistance layers 20 and a pair of rectangular resistance layers 22, which are formed on the lower major surface of the substrate 12. These resistance layers 20 and 22 are formed by diffusing an impurity such as boron. The resistance layers 20 and 22 are located in the edge portion of the diaphragm 16 and set apart by 90° in the circumferential direction of the diaphragm. Each resistance layer 20 extends in the radial direction of the diaphragm 16. Each resistance layer 20 has a negative peizoresistance when the diaphragm 16 is deformed by being subjected to a pressure difference (P1 − P2). Each resistance layer 22 extends perpendicular to the radial direction of the diaphragm 16. Each resistance layer 22 has a positive piezoresistance when the diaphragm 16 is deformed by being subjected to the pressure difference (P1 − P2).

A base 26 having a pressure-receiving hole 24 is adhered through glass on the upper surface of the semiconductor strain sensor 10 having the construction described above.

In this semiconductor strain sensor 10, the thickness of the silicon substrate 12 is greater than that of the conventional silicon substrate. In particular, the thickness of the substrate 12 is about 30 times the thickness hc of the diaphragm 16. For this reason, when the semiconductor strain sensor 10 is adhered through glass to the base 26, substantially no thermal strain will be applied to the diaphragm 16 and the resistance layers 20 and 22. As a result, a high-sensitivity characteristic can be maintained in the semiconductor strain sensor 10. Furthermore, the semiconductor strain sensors 10 obtain a high yield, as compared with that of conventional semiconductor strain sensors. For example, although the yield of conventional semiconductor strain sensors having a monocrystalline silicon substrate thickness of about 300 $\mu$m and a diaphragm thickness of about 80 $\mu$m is about 60%, the yield of semiconductor strain sensors 10 of this embodiment is about 92%.

The bottom surface of the blind hole 14 (upper surface of the diaphragm 16) has a conical shape. For this reason, a special compensation circuit need not be used, and changes in output voltage can be properly compensated for. In particular, when the ratio of the thickness $h_c$ to the thickness $h_e$ of the diaphragm 16 is properly preset, the absolute value of a change in output voltage for a pressure difference (P1 − P2) positively applied to the diaphragm can be equal to that for a pressure difference (P1−P2) negatively applied thereto. In addition to these advantages, since the corner defined by the inner peripheral surface and bottom surface of the blind hole 14 has an acute angle, the sensitivity of the diaphragm 16 with respect to the pressure can be improved, as compared with that of the conventional diaphragm.

A method for manufacturing the semiconductor strain sensor 10 will now be described.

FIGS. 6 to 8 show a grinding apparatus used for manufacturing the semiconductor strain sensor 10. The grinding apparatus has a base 30. An X-Y table 32 is placed on the base 30. A holder 34 is placed on the X-Y table 32 to fix and hold the monocrystalline silicon substrate 12 as a workpiece. A column 36 stands on the base 30. A bearing assembly 38 is supported on the column 36 to be vertically movable. The bearing assembly 38 rotatably supports a spindle 40 extending in the vertical direction. A support 42 is fixed at the lower end of the spindle 40. The spindle 40 is driven by a motor (not shown). An eccentric bearing 46 for rotatably supporting a rotating spindle 44 is mounted on the support 42 through a connecting member 48. A truncated conical grinding wheel 50 is coaxially mounted on the lower end of the rotating spindle 44. A compressed air supplying means (not shown) is disposed in the support 42. This means supplies compressed air to an air turbine mechanism (not shown) disposed in the eccentric bearing 46, so that the rotating spindle 44 can rotate at a high speed. An axis 52 of the rotating spindle 44 is inclined by an angle $\theta$ (preferably about 0.05° to 0.3°) from an axis 54 of the spindle 40 or the vertical direction. The axis 52 deviates by a distance $e_0$ from the axis 54 at the upper position of the support 42 and crosses the axis 54 at a point 56. Therefore, the axis 52 traces a conical track having the intersection 56 as a vertex upon rotation of the spindle 40.

As is apparent from FIG. 8, the grinding wheel 50 has a truncated conical recess 58 coaxially formed at the central portion of its lower surface. This lower surface constitutes an annular grinding surface 60. A radius $r_1$ of the grinding surface 60 is longer than an eccentric distance e of the axis 52 of the rotating spindle 44 with respect to the axis 54 of the spindle 40 when the grinding surface is positioned on the substrate (referred to as the workpiece hereinafter) 12. A radius $r_2$ of the recess 58 is shorter than the eccentric distance e. Therefore, the grinding surface 60 always passes through the axis 54 during the grinding operation. The grinding wheel 50 is moved upward and downward in the vertical direction upon movement of the bearing assembly 38.

The method for manufacturing the semiconductor strain sensor 10 using the grinding apparatus described above will be described hereinafter.

Figure 9:
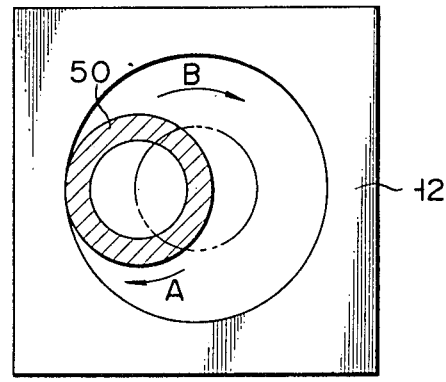
FIGS. 9 and 10 are respectively a plan view and a sectional view showing the different manufacturing steps of the manufacturing method.

A square monocrystalline silicon substrate 12 having about a 2 mm thickness and a side 10 mm long is prepared. As shown in FIG. 3, the resistance layers 20 and 22 are formed on one major surface of the substrate 12 by diffusion. The major surface of the substrate 12 which has the resistance layers 20 and 22 faces downward, and is fixed on the holder 34 to be perpendicular to the axis 54 of the spindle 40. The position of the holder 34 is adjusted by the X-Y table 32 such that the axis 54 extends through the center of the substrate 12. Thereafter, the spindle 40 is rotated by the motor at a speed of about 1 to 50 r.p.m., and the rotating spindle 44 is rotated by the air turbine mechanism at a speed of about 20,000 to 100,000 rpm. The bearing assembly 38 is then moved downward to cut by use of the grinding wheel 50 the monocrystalline silicon substrate 12. The grinding wheel 50 itself rotates along a direction indicated by the arrow A in FIG. 9, while the rotating spindle 44 orbits along the arrow B. Assume that the grinding depth of the grinding wheel 50 is adjusted to form a blind hole 14 having a depth of about 1900 $\mu$m and a diameter of 7 mm. In this case, since the silicon substrate 12 is concentrically aligned with the axis 54, the blind hole 14 is formed to be concentric with the substrate 12. The grinding surface 60 of the grinding wheel 50 always passes through the center of the blind hole 14 and is inclined by an angle $\theta$ of about 0.05° to 0.3° with respect to the horizontal direction. Therefore, the bottom surface of the blind hole 14 has a conical shape and is inclined at an angle $\theta$ of about 0.05° to 0.3° from the edge portion to the center thereof (FIG. 4). As a result, a diaphragm 16 having a thickness $h_c$ of about 100 $\mu$m is achieved.

Figure 10:
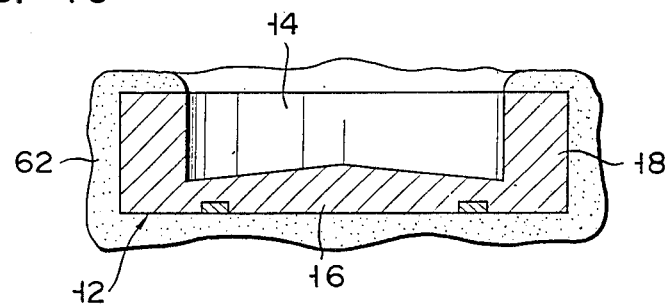

Thereafter, the operator removes the substrate 12 having the blind hole 14 from the holder 34. A mask 62 such as photoresist and wax is formed on the bottom, peripheral and upper surfaces of the substrate 12, as shown in FIG. 10. The substrate 12 is then dipped in an etching solution such as fluorine nitrate so as to etch the inner surface of the blind hole 14. The inner surface of the blind hole 14 is gradually etched by about 25 $\mu$m at an etching rate of about 2 to 5 $\mu$m/min. The diaphragm 16 is finished with tolerance of about ±1 $\mu$m, such that the thickness $h_c$ is about 75 $\mu$m, and the thickness $h_e$ is about 63 $\mu$m. At the same time, any scratch or damage to the inner surface of the blind hole 14 caused by grinding is eliminated by etching.

The semiconductor strain sensor manufactured as described above is adhered through glass to the base 26 by heating at a temperature of about 550° C. for about 30 minutes.

According to the method described above, the blind hole 14 is formed by grinding, so that a deep blind hole can be formed, as compared with the blind hole formed by the conventional etching technique. Therefore, the semiconductor strain sensor can be manufactured using a monocrystalline silicon substrate having a thickness of not less than about 1 mm. As a result, the strain sensor will undergo substantially no thermal strain at the time of glass adhesion. Furthermore, as compared with the method using the etching technique, the working efficiency and precision can be greatly improved. In addition to these advantages, the angle between the wall surface and the bottom surface of the blind hole can be acute, so that a high-sensitivity diaphragm can be obtained.

The inner surface of the blind hole is etched immediately after grinding is performed, so that any scratch or the like of the inner surface of the blind hole caused by grinding can be eliminated. As a result, a highly durable strain sensor can be manufactured. In addition to the above advantage, the blind hole is formed by the grinding wheel fixed on the rotating spindle inclined with respect to the axis of the spindle, so that the bottom surface of the blind hole can be formed in a conical shape while the blind hole is being formed. According to the method of the present invention, a high-sensitivity, high-precision semiconductor strain sensor can be manufactured.

In the above embodiment, the thickness of the monocrystalline silicon substrate is about 2 mm and is 30 times the thickness $h_c$ of the diaphragm. However, the thickness of the substrate can be arbitrarily determined provided that it exceeds 0.5 mm. However, in order to effectively protect the diaphragm from thermal strain, the thickness of the substrate preferably exceeds 1.0 mm. The ratio of the thickness $h_c$ to the thickness $h_e$ may be arbitrarily determined provided that it falls within the range of 1:1.05 to 1.25.

Figure 11:
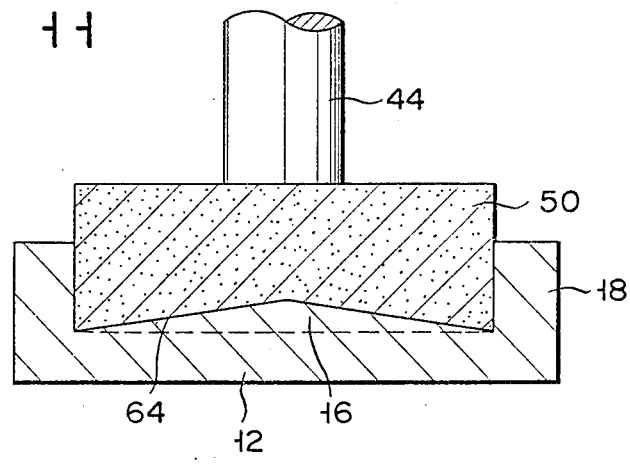
FIG. 11 is a sectional view showing part of the manufacturing steps according to a modification of the present invention.

In the above embodiment, the finishing process of the inner surface of the blind hole is performed by chemical etching. However, dry etching such as ion beam etching and plasma etching may be utilized in place of wet etching. In this case, etching precision can be improved by dry etching and the etching process can be simplified, as compared with that achieved by chemical or wet etching. In addition to these modifications, the blind hole may be formed by ultrasonic grinding in place of grinding using a grinding wheel. Furthermore, as shown in FIG. 11, a grinding wheel having a conical recess 64 corresponding to the desired conical shape of the bottom surface of the blind hole may be used.

What is claimed is:

1. A method for manufacturing a semiconductor strain sensor, comprising the steps of:

forming resistance layers on one of major surfaces of a semiconductor substrate having a pair of major surfaces which are parallel to each other;

forming a circular blind hole by grinding from the other major surface of the semiconductor substrate having the resistance layers and forming the bottom surface of the blind hole in a conical shape which projects upward from an edge portion to a central portion thereof, thereby working the semiconductor substrate to constitute a thin diaphragm and a frame; and etching an inner surface of the blind hole to eliminate a scratch formed in the inner surface of the blind hole by grinding.

2. A method according to claim 1, wherein said step of forming the circular blind hole by grinding is performed such that a grinding wheel having an orbiting axis perpendicular to the major surfaces of the semiconductor substrate and a rotating axis inclined by a predetermined angle with respect to the orbiting axis, is driven in a planetary manner, and is moved along the orbiting axis toward the other major surface of the semiconductor substrate to grind the same.

3. A method according to claim 1, wherein said step of forming the blind hole by grinding is performed such that a grinding wheel having a grinding surface which has a conical recess corresponding to the bottom surface of the blind hole, is rotated, and is moved vertically toward the other major surface of the semiconductor substrate to grind the same.

4. A method according to claim 1, wherein said step of etching is performed by chemical etching.

5. A method according to claim 1, wherein said step of etching is performed by dry etching.

* * * * *